United States Patent [19]

Scheurenberg et al.

[11] Patent Number: 4,505,355
[45] Date of Patent: Mar. 19, 1985

[54] HYDROSTATIC TRAVELLING DRIVE SYSTEM WITH TOWING CIRCUIT

[75] Inventors: Helmut Scheurenberg; Manfred Funke, both of Ratingen, Fed. Rep. of Germany

[73] Assignee: Losenhausen Maschinenbau AG, Dusseldorf, Fed. Rep. of Germany

[21] Appl. No.: 460,225

[22] Filed: Jan. 24, 1983

[30] Foreign Application Priority Data

Jan. 30, 1982 [EP] European Pat. Off. ........ 82710003.3

[51] Int. Cl.³ ............................................. B60K 17/10
[52] U.S. Cl. .................................... 180/308; 180/307; 188/170; 303/71
[58] Field of Search ............... 180/305, 306, 307, 308; 188/170; 303/71

[56] References Cited

U.S. PATENT DOCUMENTS

| | | | |
|---|---|---|---|
| 3,351,147 | 11/1967 | Williamson | 180/308 |
| 3,780,820 | 12/1973 | Schwab et al. | 180/305 |
| 3,976,333 | 8/1976 | Fillion et al. | 188/170 |
| 4,254,845 | 3/1981 | Braun | 180/308 |

Primary Examiner—Joseph F. Peters, Jr.
Assistant Examiner—Kenneth R. Rice
Attorney, Agent, or Firm—Howard H. Darbo

[57] ABSTRACT

A towing circuit (20) for a hydrostatic travelling drive system with a prime mover, a variable displacement pump (3) and a travel motor (2) supplied thereby, a parking brake (6) arranged to be applied by a brake valve (9) and, optionally, a steering booster (30) and differential gear locking means (40) actuated by a change-over valve (34) has its inlets connected to the travel motor (2) through shut-off valve means (22). A filling pump (4) is connected to supply conduits (7,32) in which the brake valve (9) and the change-over valve (34), respectively, are arranged. Feeding conduits (26,45) provided with check valves open into these supply conduits (26,45). The feeding conduits (26,45) are connected with connecting conduits (21a,21b) governed by the shut-off valve means (22). During towing operation, the travel motor (2) driven by the wheels (1) generates the auxiliary pressures in the supply conduits (7,32) required for the operation of the steering booster (30) and the differential gear locking means (40).

8 Claims, 1 Drawing Figure

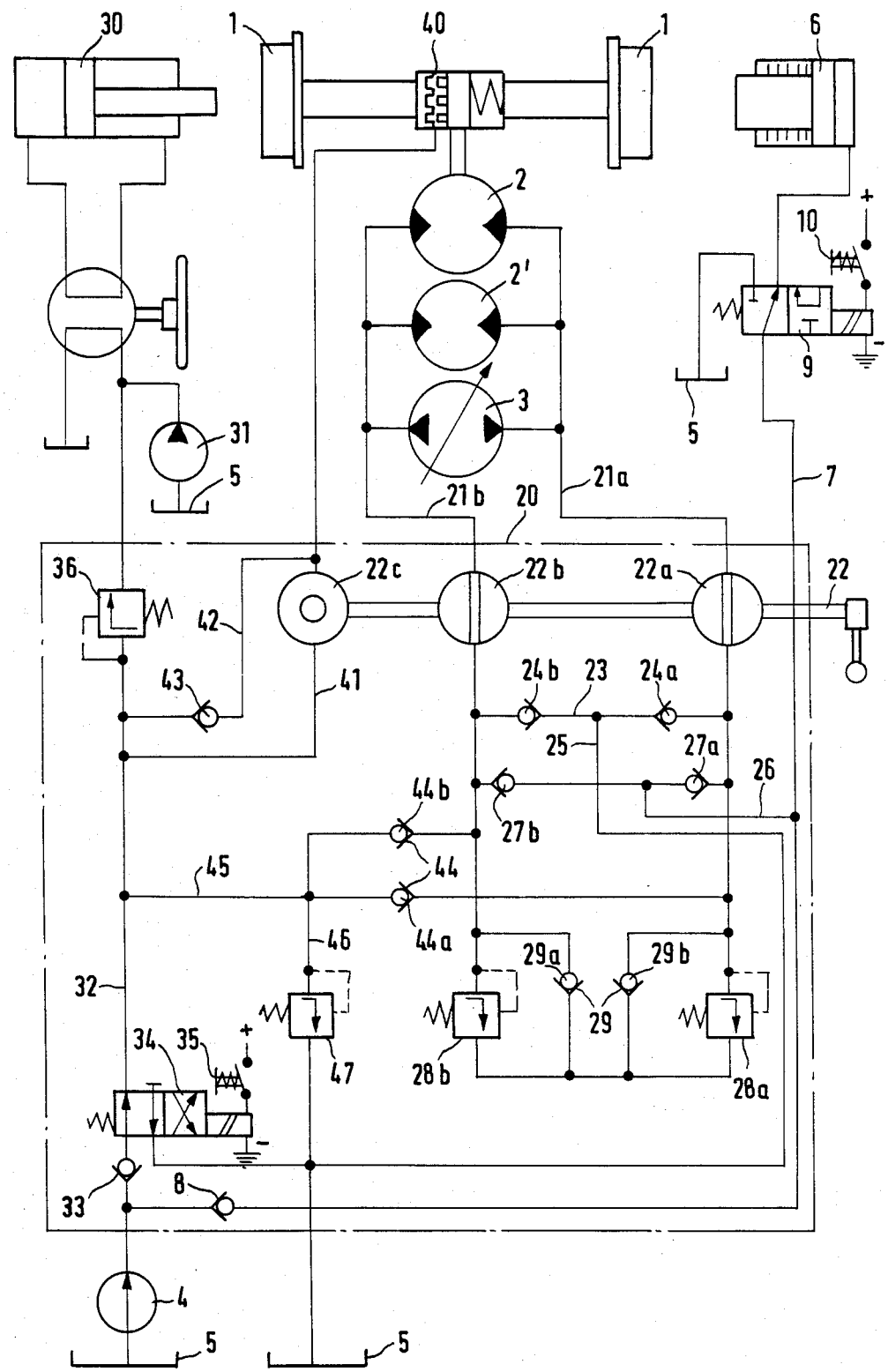

HYDROSTATIC TRAVELLING DRIVE SYSTEM WITH TOWING CIRCUIT

The invention relates to a hydrostatic travelling drive system for vehicles, comprising
 (a) a hydraulic variable displacement pump having first and second ports and arranged to be driven by a prime mover,
 (b) at least one hydraulic travel motor having first and second ports,
 (c) hydraulic connecting conduit means for connecting said first port of said variable displacement pump with said first port of said travel motor and for connecting said second port of said variable displacement pump with said second port of said travel motor, whereby a hydraulic circuit is formed by said variable displacement pump, said travel motor and said connecting conduit means, and whereby said variable displacement pump and said travel motor form a variable hydraulic transmission for transmitting the driving power from the prime mover to drive members of the vehicle,
 (d) a fluid reservoir,
 (e) a filling pump arranged to be driven together with the variable displacement pump and having an inlet port, which communicates with said fluid reservoir, and an outlet port,
 (f) means for communicating said outlet port of said filling pump with said hydraulic circuit,
 (g) a parking brake acting on said drive members and arranged to be released by fluid pressure and to be applied, when this fluid pressure is removed,
 (h) a brake conduit between said outlet port of said filling pump and said parking brake,
 (i) brake valve means arranged in said brake conduit and having first and second valve positions, which brake valve means,
  ($i_1$) in its first valve position, permits fluid flow through said brake conduit, whereby said parking brake can be released by pressure from the filling pump, and
  ($i_2$) in its second valve position shuts-off the brake conduit and connects the parking brake to the fluid reservoir, whereby said parking brake is applied, and
 (j) means for generating a fluid pressure in the parking brake independent of the filling pump to permit the parking brake to be released, while the vehicle is being towed, when the prime mover fails and the pressure from the filling pump is removed.

Prior art hydrostatic travelling drive systems of this type, for example for road construction machines, comprise a Diesel engine as prime mover. A filling pump driven by the prime mover together with the variable displacement pump supplies the required fluid pressure to the hydraulic circuit of the hydrostatic travelling drive system. Beside the operational brake of the road construction machine, a parking brake is provided, which is applied, when the fluid pressure fails and which is released by the brake lifting pressure generated by the filling pump.

Furthermore it is known to provide a hydraulic steering booster which serves to facilitate steering of heavy vehicles such as road construction machines.

Furthermore it is known to provide the driving wheels of a vehicles, such as a road roller, with differential gear locking means, which are released hydraulically. The differential gear locking means is connected to the supply conduit starting from the filling pump and comprises a change-over valve arranged in the supply conduit and being actuated through an electric push-button switch, which is connected into the ignition circuit. In the first switch position of the push-button switch and the first valve position associated therewith, the filling pump is connected to the differential gear locking means, and in the second switch position of the push-button switch and the second valve position associated therewith, the fluid reservoir is connected to the differential gear locking means. This temporarily actuated push-button switch serves to remove the differential effect from the driving wheels, if the particular propulsion conditions of the road roller make this necessary.

With such a travelling drive system, removal of the fluid pressure, for example due to failure of the prime mover, would automatically be accompanied by application of the parking brake. Then it would not be possible to tow the vehicle.

Therefore German Offenlegungsschrift No. 29 47 552 discloses an arrangement of the present type, which permits, in such a case, generation of fluid pressure for lifting the parking brake by means of a manually operated pump. With such a towing installation, however, there will soon be a pressure drop due to leakage, which will soon result in slipping application of the parking brake. Then the lifting pressure has to be restored.

French patent application No. 2 416 812 discloses a hydraulic travelling drive system of the present type with a parking brake being applied upon removal of the fluid pressure, wherein also towing is possible even with failure of the prime mover. With this arrangement the two ports of the travel motor are interconnected by a towing valve to permit free rotation of the travel motor. Fluid pressure in the parking brake is generated by means of a manually operated pump. A piston-cylinder unit connected to the hydraulic circuit and, in normal operation, serving to adjust the prime mover is used as such manually operated pump. German Auslegeschrift No. 1 224 622 discloses a hydrostatic drive system for vehicles with a variable displacement pump driven by the prime mover, and a variable capacity travel motor. The variable displacement pump and the travel motor are adjustable by means of hydraulic actuators, to which fluid under pressure is supplied by a filling pump. The problem there is to crank the prime mover by towing the vehicle. When the vehicle is out of operation, the displaced volume of the variable displacement pump normally is zero, while the travel motor is adjusted for maximum capacity. When the vehicle is towed, the travel motor ought to act as pump and the variable displacement pump ought to act as motor which cranks the prime mover. However this does not work, as the variable displacement pump is in its neutral position. For this reason, German Auslegeschrift No. 1,224,622 provides that the output pressure of the travel motor acting as pump is applied, at first, to the actuators, which do not get any control pressure from the filling pump, when the prime mover is out of operation. Thereby the variable displacement pump can be adjusted to output, so that it can act as motor during the towing operation and can rotate the prime mover. It is not the matter of releasing a parking brake for the towing but the problem is the adjustment of the variable displacement pump for cranking the prime mover.

German Offenlegungsschrift No. 2,131,387 discloses a servo installation for motor vehicles having an actuator for the transmission, or a power assist for the steering and the brakes, wherein fluid under pressure is supplied to the servo installation by an auxiliary pump driven by the prime mover. Upon pressure drop in the fluid supply line from this auxiliary pump, the servo installation is connected to an additional pump arranged to be driven by the driving wheels of the vehicle.

It is the object of the invention, with a hydrostatic travelling drive system of the type defined in the beginning, to permit convenient lifting of the parking brake for towing the vehicle, when the prime mover fails.

According to the invention this object is achieved in that (k) said means for generating a fluid pressure in said parking brake include a towing circuit connected in parallel to said hydraulic travel motor through connecting conduits, and comprising ($k_1$) shut-off valve means for separating said towing circuit from said ports of said travel motor, ($k_2$) a hydraulic circuit, which extends between said ports of said travel motor and includes pressure limiting means, respectively, which have inlet and outlet ports, and ($k_3$) communication means between one port of said travel motor and said parking brake such that the fluid pressure, which is generated by the travel motor then acting as pump upstream of said pressure limiting means causes the parking brake to be released, when the vehicle is being towed.

The towing circuit of the invention makes use of the characteristic of the travel motor to act as a pump, when the wheels in driving connection therewith rotate, whereby a hydrostatic pressure is built up in one of the ports of the travel motor upstream of the pressure limiting means. A hydraulic circuit is closed through these pressure limiting means so that the rotary motion of the travel motor during the towing procedure will not be locked, once a minimum pressure sufficient for the lifting of the parking brake has been reached. With the shut-off valve means opened, this hydrostatic pressure is applied through the connection conduits to the supply conduit and the brake conduit and, if required, also to the steering booster and to the conduit leading to the differential gear locking means, and is sufficient to supply the respective required auxiliary pressure also to these components of the hydrostatic travelling drive system. During normal travelling operation, the connecting conduits are disconnected from the travel motor by the shut-off valve means being in their closed position.

Advantageous modifications of the towing circuit of the invention are characterized in the dependent claims.

An embodiment of the invention is described in greater detail hereinbelow with reference to the accompanying drawing. The FIGURE illustrates a simplified circuit diagram of a hydrostatic travelling drive system with towing circuit.

Hereinbelow the construction and operation of a typical towing circuit will be described with reference to a road roller equipped therewith. In the circuit diagram of the FIGURE the hydrostatic travelling drive system is illustrated without the prime mover, which may, for example, be a Diesel engine. This prime mover is cranked by means of a starter circuit provided with an ignition lock and containing a battery.

Numeral 1 designates the wheels of a road roller, which are connected with a travel motor 2. The travel motor 2 has a first port and a second port. A hydraulic variable displacement pump 3 can be driven in usual manner by a prime mover (not shown). The hydraulic variable displacement pump 3 has a first port and a second port. The first port of the variable displacement pump 3 is connected with the first port of the travel motor 2, and the second port of the variable displacement pump 3 is connected with the second port of the travel motor 2 through hydraulic connection conduit means. In this way a hydraulic circuit is established by the variable displacement pump, the travel motor 2 and the connection conduit means. The variable displacement pump 3 and the travel motor 2 form a variable hydraulic transmission for transmitting the driving power from the prime mover to the wheels 1 of the road roller. In the illustrated preferred embodiment, an additional travel motor 2' for the roller barrel of the road roller is provided and is connected in parallel to the travel motor 2 and is fed together therewith by the variable displacement pump.

A filling pump 4 having an inlet port and an outlet port is driven by the prime mover together with the variable displacement pump. This inlet port communicates with a fluid reservoir 5. The output port is connected through means (not shown) to the hydraulic circuit comprising the variable displacement pump 3 and the travel motor 2. In this way fluid under low pressure is supplied to the system by the filling pump 4.

A parking brake 6 acts on the wheels 1 and is arranged to be released by fluid pressure and to be applied and to brake the wheels 1, when the fluid pressure is removed. The parking brake 6 is connected to the filling pump 4 through a brake conduit 7 and a check valve 8. A brake valve 9, which is a 3/2 directional control valve, is arranged in the brake conduit 7. In its first valve position illustrated, the brake valve 9 communicates the parking brake 6 with the filling pump 4, whereby the parking brake 6 is released under the action of the fluid pressure from the filling pump 4. When the prime mover comes to a standstill, also the filling pump 4 comes to a standstill. Then check valve 8, however, prevents the fluid pressure in the parking brake 6 from dropping. The brake valve 9 is controlled by a push-button switch 10 directly connected to the battery of the starting circuit. When the push-button switch 10 is actuated, the brake valve 9 is temporarily moved into a second valve position. In this valve position, the parking brake 6 is connected with the fluid reservoir, whereby the fluid pressure in the parking brake 7 drops and the parking brake 6 is applied.

In order to permit releasing of the parking brake 6 and thus towing of the vehicle in the case of failure of the prime mover, means are provided for generating the fluid pressure in the parking brake 6 independent of the filling pump 4. These means for generating fluid pressure in the parking brake comprise a towing circuit 20, which is shown within the dash-dot rectangle in the FIGURE. The towing circuit 20 comprises two connecting conduits 21a and 21b, which extend from the ports of the travel motor 2 (and from the ports of the travel motor 2' for the roller barrel). The connecting conduits 21a, 21b can be shut-off by manually operated shut-off valve means 22. Thereby the towing circuit 20 can be separated from the ports of the travel motor 2 by means of the shut-off valve means 22. The shut-off valve means 22 comprises two valves 22a and 22b arranged to be actuated jointly, one valve 22a being arranged in one connecting conduit 21a, and the other valve 22b being arranged in the other connecting conduit 21b. In the FIGURE the valves 22a,22b are shown in their opened position. The towing circuit 20 comprises a hydraulic circuit extending between the ports of the travel motor 2 and including pressure limiting means, for example 28a, which have an inlet and an outlet port. Furthermore the towing circuit comprises communication means between one port of the travel motor 2 and the parking brake 6 such that, when the vehicle is towed, a fluid pressure then generated at one port of the travel motor 2 upstream of the pressure limiting means by the travel motor 2 then acting as pump causes the parking brake 6 to be released. If it is assumed that the vehicle is towed in such a direction that the travel motor 2 acting as pump sucks in fluid through the left port as viewed in the FIGURE, and delivers the fluid through the right port, as viewed in the FIGURE, valves 22a and 22b being opened, circulation of this fluid will, at first, be prevented, until a certain minimum pressure has been reached. At this minimum pressure, the pressure limiting means 28a are opened, whereby the fluid circulates in the hydraulic circuit. The opening pressure of the pressure limiting means 28a is so high, that it is sufficient to lift the parking brake 6. This pressure is applied to the parking brake 6 through communication means comprising a check valve 27a, a conduit 26 and part of the brake conduit 7 to release the parking brake. The towing circuit 20 further comprises communication means comprising a conduit 25 and a check valve 24 for connecting the other port of the travel motor 2, the left port as viewed in the FIGURE, with the fluid reservoir 5, these communication means bypassing the filling pump 4. In this way the travel motor acting as pump may suck in fluid from the fluid reservoir 5, when fluid in the closed hydraulic circuit gets lost due to leakage.

With the preferred embodiment towing in both directions is possible. Thus the parking brake 6 will be released regardless of whether the towing causes the travel motor 2 to rotate in one direction or the other and, consequently, the pressure is generated at the left port or the right port.

To this end the towing circuit comprises a first pair of check valves 24a and 24b, each of which is arranged between a respective one of the connecting conduits 21a and 21b, respectively, and a conduit 25 leading to the fluid reservoir 5. Each of the check valves 24a and 24b is arranged to open in the direction from the fluid reservoir towards the associated connecting conduit 21a or 21b, respectively. The towing circuit 20 further comprises a second pair of check valves 27a and 27b, each of which is arranged between a respective one of the connecting conduits 21a and 21b, respectively, and a conduit 26 leading to the brake conduit 7. Each of the check valves 27a and 27b is arranged to open in the direction from the associated connecting conduit 21a or 21b, respectively, towards the brake conduit 7. The towing circuit 20 further comprises two pressure relief valves 28a and 28b, each of which has an inlet port and an outlet port and which represent said pressure limiting means. Each of the inlet ports of the pressure relief valves 28a and 28b is connected to an associated one of the connecting conduits 21a or 21b, respectively. The outlet port of that pressure relief valve 28a or 28b the inlet port of which is connected to one connecting conduit 21a or 21b, respectively, communicates through a check valve 29a or 29b, respectively, with the respective other connecting conduit 21b or 21a, respectively. The check valve 29a is arranged to open in the direction towards the connecting conduit 21b. The check valve 29b is arranged to open in the direction towards the connecting conduit 21a.

If the direction of rotation of the travel motor 2 during towing operation is such that the travel motor 2 sucks in fluid through the left port as viewed in the FIGURE and delivers fluid through the right port as viewed in the FIGURE, this results in a fluid circulation from the right port of the travel motor 2 through the connecting conduit 21a, the pressure relief valve 28a, the check valve 29a and the connecting conduit 21b to the left port of the travel motor 2. The check valve 29b is closed. The pressure relief valve 28b is bypassed by the check valve 29a. Thus there is a closed circuit, whereby the rotary motion of the travel motor 2 is not hydraulically locked during the towing operation. The pressure relief valve 28a ensures, however, that a pressure, which is sufficient to release the parking brake 6, will build up in the connecting conduit 21a upstream of the pressure relief valve 28a. The pressure is transmitted to the brake conduit 7 through the check valve 27a and conduit 26. Fluid losses in this hydraulic circuit due to leakage can be compensated for by the travel motor 2 sucking in fluid from the fluid reservoir 5 through conduit 25, check valve 24 and the connecting conduit 21b. If, however, the travel motor 2 is driven in the opposite direction, a pressure builds up in the connecting conduit 21b upstream of the pressure relief valve 28b, this pressure being applied to the brake conduit 7 and the parking brake 6 through the check valve 27b and conduit 26. In this case, fluid can be sucked in through conduit 25 and check valve 24a into the connecting conduit 21a.

In normal operation, the parking brake 6 receives fluid under pressure from the filling pump 4 through the check valve 8, which is arranged to open in the direction towards the brake conduit 7 and the parking brake 6. When the prime mover fails and thus also the filling pump does not supply any fluid, the fluid pressure in the parking brake will be supplied, during towing operation, through conduit 26 and the brake line 7, as described. In this case, the check valve shuts-off the brake conduit 7 towards the filling pump 4. In normal operation, the shut-off valve means 22 is in a position in which both valves 22a and 22b are closed. In this case, the towing circuit 20 has no influence whatsoever on the operation of the hydrostatic travelling drive system. In order to permit towing of the vehicle, the shut-off valve means 22 is changed over manually into the position illustrated.

The towing operation with the arrangement described has to be initiated against the action of the applied parking brake 6. However already a slight rotation of the roller barrel and of the wheels 1 is sufficient to generate a pressure by which the parking brake is released. At the end of the towing operation, the shut-off valve means 22 is moved into its closing position, in which the connecting conduits 21a and 21b are separated from the travel motors 2 and 2' by the valves 22a and 22b. The fluid pressure in the brake conduit 7 is maintained, as the brake conduit 7 is closed by the check valves 8 and 27a and 27b. At the end of the towing operation, the parking brake 6 may, however, be applied by actuating the push-button switch 10 connected to the battery.

In the embodiment illustrated in the FIGURE, a steering booster 30 and differential gear locking means 40 are provided in addition to the parking brake 6. In operation of the road roller, auxiliary pressure required for the operation of the steering booster is supplied to the steering booster 30 by a steering pump 31. The differential gear locking means 40 receives auxiliary pressure for lifting the differential gear locking means from the filling pump 4. During towing operation, this auxiliary pressure is supplied by the towing circuit 20, as will be described hereinbelow.

The steering booster 30 is connected to the steering pump 31. Parallel thereto the steering booster 30 is connected to a supply conduit 32. The supply conduit 32 contains a check valve 33 at its inlet side, said check valve 33 being arranged to open under the pressure of the running filling pump 4, and a change-over valve 34 downstream thereof. The change-over valve 34 is a 4/2-directional control valve, which is arranged to be actuated by a push-button switch 35 in the starting circuit. Furthermore a pressure relief valve 36 is connected into the supply conduit upstream of the steering booster 30.

The differential gear locking means 40, constructed in conventional manner, at the wheels 1 is connected to the supply conduit 32 through a conduit 41. A valve 22c, which is part of the shut-off valve means 22 and is also actuated, when the shut-off valve means 22 is actuated, is connected into conduit 41. In the towing position illustrated of the shut-off valve means 22, valve 22c is closed. In the travel operation position (not shown) of the shut-off valve means 22, the valve 22c is opened, such that the fluid pressure generated by the filling pump 4 can be applied to the differential gear locking means 40 through conduit 41. Thereby the differential gear locking means 40 is released. The valve 22c is bypassed by a bypass conduit 42 which contains a check valve 43 arranged to open in flow direction towards the differential gear locking means. The change-over valve 34 arranged in the supply conduit 32 is illustrated in its first valve position, in which it establishes communication between the filling pump 4 and the supply conduit 32.

The connecting conduits 21a and 21b of the towing circuit are connected through respective check valves 44a and 44b, respectively, to a feeding conduit 45, which leads to the supply conduit 32, and to a return conduit, which leads to the fluid reservoir 5 through a pressure relief valve 47. The pressure relief valve 47 has an inlet port and an outlet port. The inlet port of the pressure relief valve 47 is connected to the supply conduit 32 through conduit 46 with the check valves 44a, 44b and through the feeding conduit 45. The outlet port of the pressure relief valve 47 communicates with the fluid reservoir 5.

The travelling drive system described hereinbefore and comprising the steering booster 30 and the differential gear locking means 40 in addition to the parking brake operates as follows, when the towing circuit is operative: It is again assumed that the prime mover is at a standstill and the variable displacement pump 3 and the filling pump 4 do not run, and that the parking brake 6 is applied. Due to the check valve 43 in the bypass conduit 42 and the check valve 33 in the supply conduit in combination with the illustrated position of the change-over valve 34, the lifting pressure in the differential gear locking means 40 maintained. In the positions of the shut-off valves 22a and 22b, conduit 41 to the differential gear locking means 40 is closed by valve 22c.

As has been described hereinbefore, the parking brake is exposed to fluid pressure, during the towing procedure, through the check valve 27a or the check valve 27b (depending on the direction of rotation of the travel motor) and is released thereby. Fluid pressure is applied to the feeding conduit 45 and from there to the supply conduit 32 from the respective pressure conducting connecting conduit 21a or 21b, said supply conduit 32 being separated from the filling pump 4 by the check valve 32. Thus the auxiliary pressure required for the operation of the steering booster 30 and for lifting the differential gear locking means 40 prevails in the supply conduit 32. The auxiliary pressure is ensured by the pressure relief valve 47. Thus during the towing procedure not only the parking brake is released. Also the differential gear locking means 40 is safely held in its released state. The steering mechanism is operable with the steering booster 30. As the push-button switch 35 of the change-over valve 34 is connected into the starting circuit, and this starting circuit is deenergized, the change-over valve remains in the position illustrated, during the whole towing procedure.

At the end of the towing procedure, the shut-off valve means 22 are changed over. They are then in the travel operation position, in which the connecting conduits 21a and 21b are closed and the conduit 41 to the differential gear locking means 40 is opened. When the prime mover is cranked, the filling pump 4 and the steering pump 31 start again. Under the action of the fluid pressure generated by the filling pump 4, the check valve 8 in the brake conduit 7 and the check valve 32 in the supply conduit open. Thus, in travel operation, the filling pump 4 supplies the auxiliary pressure required to release the parking brake and to release the differential gear locking means 40. The push-button switch 35 of the change-over valve 34 serves to actuate the differential gear locking means 40 only temporarily during travel operation. With such actuation, the change-over valve 34 is moved temporarily into its second valve position, in which the differential gear locking means 40 is connected to the fluid reservoir. Thereby the fluid pressure it the conduit 41 drops, and the differential gear locking means 40 is engaged. The steering function is not affected thereby, as the steering pump continues to supply fluid to the steering booster 30. As the brake conduit 7 branches-off from the supply conduit upstream of the change-over valve 34, also the parking brake 6 is not affected by the actuation of the change-over valve 34.

We claim:

1. Hydrostatic travelling drive system for vehicles, comprising
   (a) a hydraulic variable displacement pump (3) having first and second ports and arranged to be driven by a prime mover,
   (b) at least one hydraulic travel motor (2) having first and second ports,
   (c) hydraulic connecting conduit means for connecting said first port of said variable displacement pump (3) with said first port of said travel motor (2) and for connecting said second port of said variable displacement pump (3) with said second port of said travel motor (2), whereby a hydraulic circuit is formed by said variable displacement pump (3), said travel motor (2) and said connecting conduit means, and whereby said variable displacement pump (3) and said travel motor (2) form a variable hydraulic transmission for transmitting the driving power from the prime mover to drive members (1) of the vehicle,
(d) a fluid reservoir (5)
(e) a filling pump (4) arranged to be driven together with the variable displacement pump (3) and having an inlet port, which communicates with said fluid reservoir (5), and an outlet port,
(f) means for communicating said outlet port of said filling pump (4) with said hydraulic circuit,
(g) a parking brake (6) acting on said drive members (1) and arranged to be released by fluid pressure and to be applied, when this fluid pressure is removed,
(h) a brake conduit (7) between said outlet port of said filling pump (4) and said parking brake (6)
(i) brake valve means (9) arranged in said brake conduit (7) and having first and second valve positions, which brake valve means,
  ($i_1$) in its first valve position, permits fluid flow through said brake conduit (7), whereby said parking brake (6) can be released by pressure from the filling pump, and
  ($i_2$) in its second valve position shuts-off the brake conduit (7) and connects the parking brake (6) to the fluid reservoir (5), whereby said parking brake (6) is applied, and
(j) means for generating a fluid pressure in the parking brake (6) independent of the filling pump (4) to permit the parking brake (6) to be released while the vehicle is being towed, when the prime mover fails and the pressure from the filling pump (4) is removed,
characterized in that
(k) said means for generating a fluid pressure in said parking brake (6) include a towing circuit (20) connected in parallel to said hydraulic travel motor (2) through connecting conduits (21a,21b), and comprising
  ($k_1$) shut-off valve means (22) for separating said towing circuit (20) from said ports of said travel motor (2),
  ($k_2$) a hydraulic circuit, which extends between said ports of said travel motor (2) and includes pressure limiting means (28a and 28b, respectively), which have inlet and outlet ports, and
  ($k_3$) communication means (26,27a and 27b, respectively) between one port of said travel motor (2) and said parking brake (6) such that the fluid pressure, which is generated by the travel motor (2) then acting as pump upstream of said pressure limiting means (28a and 28b, respectively), causes the parking brake (6) to be released, when the vehicle is being towed.

2. Travelling drive system as claimed in claim 1, characterized in that the towing circuit (20) additionally comprises communication means (24a and 24b, respectively, 25) between the other port of said travel motor (2) and said fluid reservoir (5) bypassing said filling pump (4).

3. Travelling drive system as claimed in claim 1, characterized in that
(a) said shut-off valve means (22) comprises two shut-off valves (22a,22b) arranged to be actuated jointly, one of said shut-off valves (22a,22b) being connecting into each of said connecting conduits (21a,21b), whereby said two connecting conduits can be shut-off or opened jointly,
(b) said towing circuit (20) comprises a first pair of check valves (24a,24b), which are arranged between one of said connecting conduits (21a,21b) each and said fluid reservoir (5), and each of which is arranged to open in the direction from the fluid reservoir (5) towards the associated connecting conduit (21a,21b), and
(c) said towing circuit (20) comprises a second pair of check valves (27a,27b), which are arranged between one of said connecting conduits (21a,21b) each and said brake conduit (6), and each of which is arranged to open in the direction from the associated connecting conduit (21a,21b) towards said braking conduit (7).

4. Travelling drive system as claimed in claim 3, characterized in that
(a) said towing circuit (20) further comprises two pressure relief valves (28a,28b) as said pressure limiting means, each of said pressure relief valves having an inlet port and and outlet port,
(b) the inlet ports of said pressure relief valves (28a,28b) are connected to one of said connecting conduits (21a,21b) each,
(c) the outlet port of each pressure relief valve (28a,28b), the inlet port of which is connected to one connecting conduit (21a,21b), communicates with the respective other connecting conduit (21b,21a) through a check valve (29a,29b), which opens in the direction towards said other connecting conduit (21b,21a).

5. Travelling drive system as claimed in claims 3, characterized in that a check valve (8) is arranged between said brake conduit (7) and said outlet port of said filling pump (4), said check valve opening in the direction towards said brake conduit (7).

6. Travelling drive system as claimed in claim 4, characterized by
(a) a hydraulic steering booster (30) which is supplied with hydraulic fluid from a steering pump (31) arranged to be driven by said prime mover,
(b) a further pressure relief valve (47) having an inlet port and an outlet port, said outlet port communicating with said fluid reservoir and said inlet port being connected with said steering booster,
(c) one check valve (44,44b) between each of said connecting conduits (21a,21b) and said inlet port of said further pressure relief valve (47), said check valves being arranged to open in the direction towards this inlet port.

7. Travelling drive system as claimed in claim 4, characterized in that
(a) differential gear locking means (40) are provided and are arranged to be disengaged by exposure to fluid pressure,
(b) said differential gear locking means (40) being connected with the outlet port of the filling pump (4) through a check valve (33) which is arranged to open in the direction towards said differential gear locking means (40),
(c) a valve (34) is arranged to optionally connect said differential gear locking means (40) downstream of said check valve (33) to said fluid reservoir (5),
(d) a further pressure relief valve (47) having an inlet port and an outlet port is provided, said outlet port communicating with said fluid reservoir (5) and said inlet port communicating with said differential gear locking means (40) downstream of said check valve (33), and (e) one check valve (44a,44b) each is connected between each of the connecting conduits (21a,21b) and said inlet port of said further pressure relief valve (47) and is arranged to open in the direction towards said inlet port.

8. Travelling drive system as claimed in claim 7, characterized in that (a) said shut-off valve means (22) comprises a further shut-off valve (22c) which is arranged to be actuated jointly with the other two shut-off valves (22a,22b) and which is shut-off, when the two other shut-off valves are open and vice versa, (b) said further shut-off valve (22c) is connected between said inlet port of said further pressure relief valve (47) and said differential gear locking means (40), and (c) said further shut-off valve (22c) is bypassed by a bypass conduit (42) including a check valve (43), which is arranged to open in the direction towards said differential gear locking means (40).

* * * * *